US010391672B2

(12) United States Patent
Pedretti

(10) Patent No.: US 10,391,672 B2
(45) Date of Patent: Aug. 27, 2019

(54) DRILLING TOOL

(71) Applicant: Robert Bosch GmbH, Stuttgart (DE)

(72) Inventor: Andrea Pedretti, Rivera (CH)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 15/284,300

(22) Filed: Oct. 3, 2016

(65) Prior Publication Data

US 2017/0113377 A1 Apr. 27, 2017

(30) Foreign Application Priority Data

Oct. 22, 2015 (DE) ........................ 10 2015 220 634

(51) Int. Cl.

*B23B 51/02* (2006.01)
*B28D 1/14* (2006.01)
*B23B 51/04* (2006.01)

(52) U.S. Cl.

CPC .............. *B28D 1/146* (2013.01); *B23B 51/02* (2013.01); *B23B 51/0466* (2013.01); *B23B 2226/75* (2013.01); *B23B 2251/14* (2013.01); *B23B 2251/18* (2013.01); *B23B 2251/50* (2013.01)

(58) Field of Classification Search

CPC .............................. B23B 51/02; E21B 10/445
See application file for complete search history.

(56) References Cited

U.S. PATENT DOCUMENTS 4,889,200 A * 12/1989 Moser ...................... B23B 51/02 175/394
4,951,761 A * 8/1990 Peetz .................... E21B 10/445 175/394
6,129,162 A * 10/2000 Hauptmann .......... E21B 10/445 175/394
7,861,807 B2 * 1/2011 Probst ..................... B23B 51/02 175/415

(Continued)

FOREIGN PATENT DOCUMENTS

DE 100 38 039 A1 2/2001
DE 20 2011 103 209 U1 1/2013

(Continued)

OTHER PUBLICATIONS

Machine translation of JP2006-326996A, Sato, 2006.*
Machine translation of JP2007-168041A, Sato, 2007.*

*Primary Examiner* — Brad Harcourt
*Assistant Examiner* — Steven A MacDonald
(74) *Attorney, Agent, or Firm* — Maginot, Moore & Beck LLP

(57) ABSTRACT

A drilling tool is configured to perform drilling and/or percussive work on materials such as stone, concrete and/or reinforced concrete. The drilling tool has a fastening region and a working region. The working region has a working body and at least one cutting element projecting axially and/or radially in relation to the working body. The at least one cutting element has at least one first cutting edge and at least one second cutting edge. The at least one second cutting edge is configured to serve as a replacement cutting (Continued)

edge and/or as an auxiliary cutting edge, and the at least one second cutting edge is set back, at least partly, in relation to the at least one first cutting edge of the drilling tool, axially along a longitudinal axis of the drilling tool, in a direction towards the fastening region.

18 Claims, 4 Drawing Sheets

(56) References Cited

U.S. PATENT DOCUMENTS

| | | | | |
|---|---|---|---|---|
| 2003/0118414 | A1* | 6/2003 | Fuss | B23B 51/02 408/230 |
| 2003/0138304 | A1* | 7/2003 | Haussmann | B23B 51/02 408/227 |
| 2006/0243496 | A1* | 11/2006 | Widmann | B23B 51/02 175/426 |
| 2007/0209842 | A1* | 9/2007 | Heemann | E21B 10/58 175/426 |
| 2010/0158625 | A1* | 6/2010 | Wetter | B23B 51/02 408/227 |
| 2013/0115020 | A1* | 5/2013 | Schwarz | B23B 51/02 408/230 |
| 2013/0319774 | A1* | 12/2013 | Hammer | E21B 10/44 175/394 |

FOREIGN PATENT DOCUMENTS

| | | | | |
|---|---|---|---|---|
| DE | 10 2012 221 812 | A1 | | 6/2014 |
| EP | 1 273 372 | A1 | | 1/2003 |
| EP | 2 050 530 | A1 | | 4/2009 |
| EP | 2 199 531 | A2 | | 6/2010 |
| GB | 737471 | | | 9/1955 |
| JP | 2006326996 | A | * | 12/2006 |
| JP | 2007168041 | A | * | 7/2007 |
| WO | 2013/143348 | A1 | | 10/2013 |

* cited by examiner

DRILLING TOOL

This application claims priority under 35 U.S.C. § 119 to patent application number DE 10 2015 220 634.3, filed on Oct. 22, 2015 in Germany, the disclosure of which is incorporated herein by reference in its entirety.

BACKGROUND

The disclosure relates to a drilling tool for performing drilling and/or percussive work on materials, in particular materials such as stone, concrete and/or reinforced concrete, having a working region that has a working body and that has at least one cutting element, in particular realized as a tip cutter, projecting axially and/or radially in relation to the working body, the at least one cutting element having at least one first cutting edge and at least one second cutting edge.

EP 1 273 372 A1 discloses a drill bit, in particular for drilling stone, having an elongate shank and at least one tip cutter at one end. The tip cutter has cutting edges, which are formed by mutually abutting flanks and rake faces. Between peripheral portions on the circumference of the drill bit and portions in the center of the drill bit, the rake faces have one or more recesses that extend into the adjacent flanks. These recesses reduce the wedge angle, at least in an immediate longitudinal portion reaching at least the cutting edges, in relation to the rest of the cutting edge portions. An improved drilling performance is thereby achieved, with good fracture safety of the cutting edges.

SUMMARY

The disclosure is based on the object of improving a drilling tool for a power tool, in particular a hand-held power tool, by simple measures.

The object is achieved by a drilling tool for performing drilling and/or percussive work on materials, in particular materials such as stone, concrete and/or reinforced concrete, having a working region that has a working body and that has at least one cutting element, in particular realized as a tip cutter, projecting axially and/or radially in relation to the working body, the at least one cutting element having at least one first cutting edge and at least one second cutting edge.

According to the disclosure, the at least one second cutting edge serves as a replacement cutting edge and/or as an auxiliary cutting edge, and the at least one second cutting edge is set back, in particular at least partly, in relation to the at least one first cutting edge of the drilling tool, axially along a longitudinal axis of the drilling tool, in the direction towards the fastening region.

The disclosure makes it possible to provide a drilling tool having an increased tool life, in that, after a first cutting edge has become worn, drilling can be performed with a second cutting edge. The first cutting edge can be ground as drilling performance decreases, or as drilling speed decreases, in particular when in a worn state, in order to expose, or provide, the second cutting edge for drilling. In particular, the tool life of the drilling tool can thereby be increased significantly, in particular doubled, since, when a first cutting edge has become worn, it is possible to continue working with a second cutting edge that is realized as a replacement cutting edge. For a user, particularly in the case of drilling tools of large dimensions, it is very advantageous and sparing of resources to expose a second cutting edge, realized as a replacement cutting edge, instead of replacing the worn drilling tool with a new drilling tool.

The drilling tool according to the disclosure is of a single-part or multipart structure. If the drilling tool is of a multipart embodiment, the parts may be joined by means of a welded or soldered joint. Also conceivable in principle are other joints between the multipart embodiment of the drilling tool, that are considered appropriate by persons skilled in the art.

Preferably, the drilling tool, in particular the working body of the drilling tool, may have a fastening region adjacent to, in particular adjoining, the working region, for fastening the drilling tool, in particular in a holding device of a power tool.

The cutting element in this case may be made of a material that differs from that of the working body. The cutting element may contain, or be composed of, a hard metal.

The at least one cutting edge is realized as a replacement cutting edge and/or as an auxiliary cutting edge.

The term "tip cutter" is to be understood to mean, in particular, that the cutting element is of a substantially dimensionally stable and flat design. A tip cutter is already known to persons skilled in the art and is therefore not described in greater detail.

The term "cutting edge" is intended here to define, in particular, an edge of the cutting element that is provided to remove, cut off and/or scrape away particles of the workpiece when work is being performed on the workpiece. The cutting edge may be realized as at least one corner and/or at least one taper.

"Set back" in this context is to be understood to mean that, in particular, the first cutting edge adjoins the second cutting edge or is at a distance from the second cutting edge.

A "replacement cutting edge" is to be understood to mean a cutting edge provided to compensate, at least partly, or to replace, in particular, a function and/or an action of a cutting edge, for example of a damaged and/or worn cutting edge, in particular of a first cutting edge.

An "auxiliary cutting edge" is to be understood to mean a cutting edge provided to perform a protective, deflecting and/or pre-cutting function and/or action, preferably for a cutting edge succeeding contrary to the direction of rotation.

A "direction of rotation" is to be understood to mean, in particular, a direction that is at a distance from a longitudinal axis of the drilling tool, and that can be described by points along a curved path, in particular an orbital or circular path and that, in particular, defines a drilling direction of rotation of the drilling tool. In particular, the direction of rotation may be clockwise or anti-clockwise, according to the orientation of the cutting edges.

In particular, the second cutting edge may have an axial offset, along the longitudinal axis of the drilling tool, in relation to the first cutting edge.

The following description specifies expedient developments of the drilling tool according to the disclosure.

It may be expedient, during operation of the drilling tool, for the at least one first cutting edge, in the case of a rotation about the longitudinal axis, to define a first envelope, and the at least one second cutting edge, in the case of a rotation about the longitudinal axis, to define a second envelope, the second envelope being set back, in particular at least partly, in relation to the first envelope, axially along the longitudinal axis of the drilling tool, in the direction towards the fastening region of the drilling tool. Furthermore, it may be expedient for the first envelope to be parallel to the second envelope.

Further, it may be expedient for the at least one second cutting edge to be disposed parallel to the at least one first cutting edge.

In particular, the second cutting edge may be at a constant distance from the first cutting edge.

In particular, up to 100%, preferably up to 90%, more preferably up to 80%, particularly preferably up to 70%, of a maximum, in particular axial and/or radial, extent of the at least one second cutting edge may be disposed parallel to the at least one first cutting edge.

This makes it possible to achieve the effect that, during operation of the drilling tool, in particular with the first cutting edge, the second cutting edge wears down in a less pronounced manner, or to a lesser extent, than the first cutting edge, and preferably does not wear down. The second cutting edge can thus be spared, so as to be exposed in order to perform work on a workpiece after the first cutting edge has become worn.

In particular, the second envelope may be located entirely within the first envelope and/or touch the first envelope only at a drill-bit tip.

Preferably, the at least one first and/or second cutting edge may extend, in particular strictly, monotonically from a drill-bit tip to a circumferential region, in particular a circumferential surface, of the cutting element.

Preferably, the second envelope may intersect the first envelope, in particular in a region of the drilling tip.

In particular, the first envelope and the second envelope may be realized in the shape of a cone. Preferably, the first envelope may be angled, in relation to the longitudinal axis of the drilling tool, to a greater extent than the second envelope.

An "envelope" is to be understood to mean a rotational surface that is realized by a rotation of a cutting edge, in particular of the first cutting edge or second cutting edge, about a longitudinal axis of the drilling tool.

"At least partly set back" in this context is to be understood to mean that, in particular, the first envelope adjoins the second envelope or is at a distance from the second envelope.

In respect of the first and the second cutting edge, or the first and the second envelope, "set back" is to be understood to mean, in particular, that the second cutting edge does not touch, or at least does not go through, the first cutting edge, or the second envelope does not touch, or at least does not go through, the first envelope, in an axial direction from the working region to the fastening region, preferably the second cutting edge, or the second envelope, is located entirely behind the first cutting edge, or the first envelope, respectively, in an axial direction from the working region to the fastening region.

Furthermore, it may be expedient for an, in particular axial, indentation to be provided between the at least one first cutting edge and the at least one second cutting edge. The indentation may have at least one face. The indentation in this case may have a flat face and/or a curved face. In particular, the at least one curved surface may be concave in form. The indentation may be realized as a notch. The indentation may have at least one edge that delimits an axial extent of the indentation. The indentation may be set back, at least partly, in relation to the second cutting edge, contrary to the direction of advance of the drilling tool. In particular, an edge of the indentation may be set back, at least partly, in relation to the second cutting edge, contrary to the direction of advance of the drilling tool.

The indentation may advantageously have at least one rake face, in particular of the first cutting edge, and/or a flank, in particular of the second cutting edge. This enables the second cutting edge to be exposed in a particularly rapid and simple manner, so that the worn drilling tool can rapidly be used again.

Preferably, the indentation may have a marking that indicates to the operator of the drilling tool when the first cutting edge has become worn, and/or up to which point the operator must wear down the first cutting edge in order to expose the second cutting edge in a subsequent exposure operation. The marking in this case may be realized as an edge, a recess or an additional indentation.

The marking may be realized as a predetermined breaking point. This allows a user of the drilling tool to break or grind the first cutting edge at a position provided for this purpose.

Preferably, the at least one cutting element, in particular the at least one first cutting edge and the at least one second cutting edge, may be realized as a single piece.

"As a single piece" is to be understood to mean, in particular, connected at least in a materially bonded manner, for example by a welding process, an adhesive bonding process, an injection process, a stamping operation, a laser cutting operation and/or another process considered appropriate by persons skilled in the art, and/or, advantageously, formed in one piece such as, for example, by being produced from a casting and/or by being produced in a single or multi-component injection process and, particularly advantageously, from a single blank.

Preferably, the at least one second cutting edge may be set back, in particular at least partly, in relation to the at least one first cutting edge, contrary to a direction of rotation of the drilling tool. In particular, the second cutting edge may be provided in a flank region of the first cutting edge. This prevents the second cutting edge from becoming damaged, or worn, when the first cutting edge is projecting freely, or is not worn.

Particularly preferably, the at least one first cutting edge may be set back, in particular at least partly, in relation to the at least one second cutting edge, contrary to a direction of rotation of the drilling tool.

In particular, the second cutting edge may be provided in a rake face region of the first cutting edge. This makes it possible, advantageously, for the second cutting edge to be realized as a protective cutting edge that, for example, deflects or pre-cuts hard materials exposed in the material to be drilled, such that these materials do not come into direct contact with, for example, the first cutting edge, and damage the latter. In this regard, reference is made to the application DE 10 2012 221812 A1, the content of which is hereby included in this application.

The disclosure additionally makes it possible to provide an increased tool life, in that hard materials exposed during drilling, such as, for example, metal reinforcements, do not come into direct contact with the first cutting edge, but are deflected, or at least partly pre-cut or pre-worked, by means of a second cutting edge. Since the second cutting edge, at least partly set back in relation to the first cutting edge, is largely protected against wear, the second cutting edge can act on projecting metal reinforcements in order, preferably, to cut off, cut away, cut up and/or otherwise disaggregate and remove these metal reinforcements, at least partly.

It may additionally be advantageous for at least one second cutting edge to be offset, in particular at least partly, in relation to the at least one first cutting edge in the direction of rotation, and at least one further second cutting edge to be offset, in particular at least partly, contrary to the direction of rotation of the drilling tool.

In particular, the at least one second cutting edge may be adjacent to a circumferential region of the drilling tool. Preferably, the at least one second cutting edge may be disposed in a radially outer region of the cutting element. This enables the second cutting edge to be provided only in the region of the drilling tool that, owing to greater friction, has greater wear.

It may additionally be expedient for a maximum radial extent of the at least one second cutting edge to extend by up to 90%, in particular up to 80%, preferably up to 70%, more preferably up to 60%, particularly preferably up to 50%, in relation to a maximum radial extent of the at least one first cutting edge.

Furthermore, it may be expedient for a maximum axial extent of the at least one second cutting edge to extend by up to 90%, in particular up to 80%, preferably up to 70%, more preferably up to 60%, particularly preferably up to 50%, in relation to a maximum radial extent of the at least one first cutting edge.

This enables the second cutting edge to be provided, optimally, where the greatest wear occurs, such that only the part of the first cutting edge that has a high degree of wear is replaced by the second cutting edge.

It is additionally proposed that at least one cutting element be realized as a secondary cutting element. This allows a second cutting edge to be exposed when a first cutting edge of the secondary cutting element has become worn.

Furthermore, it is proposed to realize at least one cutting element as a main cutting element. This provides the possibility of exposing a second cutting edge when a first cutting edge of the main cutting element has become worn.

In an advantageous embodiment, the drilling tool may be realized as a twist drilling tool or as a hollow drilling tool.

Expediently, the working body of the working region may have at least one, in particular helical, groove extending around a longitudinal axis of the drilling tool, for conveying drilling dust. This enables drilling dust to be conveyed out of the working region, or out of the drilled hole.

Particularly preferably, at least one cutting element may be realized so as to constitute a single piece, in particular to be integral, with the working body. Advantageously, this enables the production work to be minimized.

BRIEF DESCRIPTION OF THE DRAWINGS

Further advantages are disclosed by the following description of the drawing. Exemplary embodiments of the disclosure are represented in the drawing. The drawing and the description contain numerous features in combination. Persons skilled in the art will expediently also consider these features individually and combine them to form appropriate further combinations.

There are shown in this case

In the following figures, parts that are the same are denoted by the same references.

DETAILED DESCRIPTION

The following figures each relate to a drilling tool for performing drilling and/or percussive work on, in particular mineral, materials such as, for example, stone, concrete and/or reinforced concrete. The drilling tool is, in particular, for fastening in a holding device of a power tool, preferably a hand-held power tool, having a rotatory and/or translatory working motion on a workpiece on which work is to be performed. In this case, a translatory advance into the workpiece is made in that the operator of the hand-held power tool applies a force to the hand-held power tool, in particular to a housing of the hand-held power tool. The drilling tool according to the disclosure may also be provided for performing work on other materials, considered appropriate by persons skilled in the art, such as wood, plastic or a composite.

Figure 1:
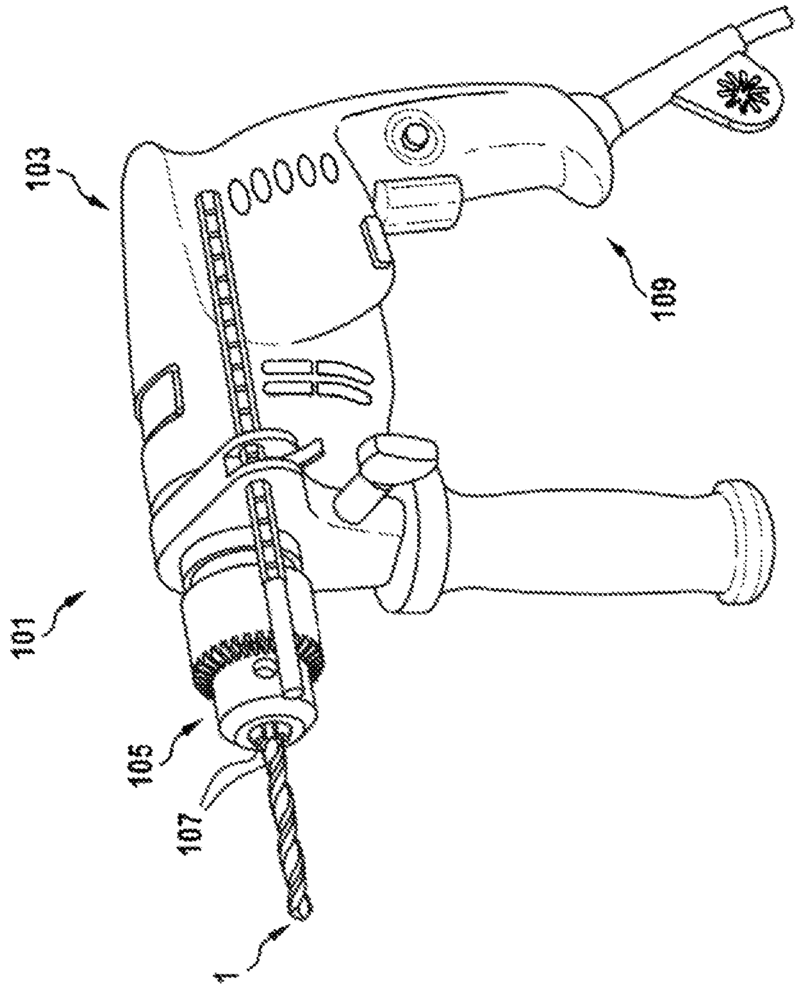
FIG. 1 a perspective view of a hand-held power tool, with a drilling tool.

FIG. 1 shows a perspective view of a hand-held power tool 101, having a drilling tool 1 clamped in the holding device 105. The hand-held power tool 101 has a hand-held power-tool housing 103, having at least one grip region 109, to be gripped by at least one hand of a user. The holding device 105 may have, for example, three clamping jaws 107, of which only two clamping jaws 107 are shown. The clamping jaws 107 clamp the drilling tool 1 radially and/or axially in the holding device 105.

Figure 2:
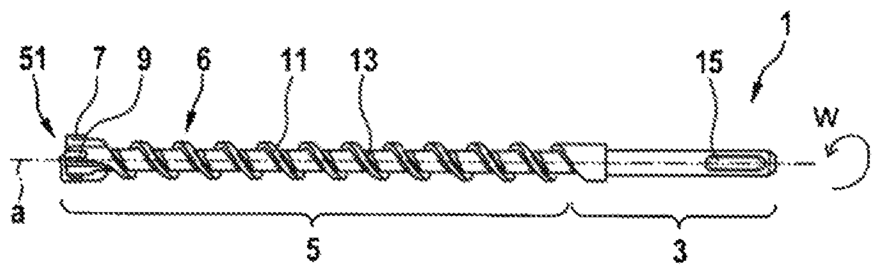
FIG. 2 a view of a first embodiment of a drilling tool according to the disclosure, FIG. 3 a perspective view of a second embodiment of a drilling tool, FIG. 4 a perspective view of a cutting element of a third embodiment of the drilling tool, FIG. 5 a perspective view of a fourth embodiment of a drilling tool, and FIG. 6 a perspective view of a cutting element of the fourth embodiment of the drilling tool.

FIG. 2 shows a first embodiment of a drilling tool 1, having a fastening region 3 for fastening in a holding device 105 of a hand-held power tool 101, and having a working region 5 for performing work on a workpiece. The drilling tool 1 is realized, at least substantially, in the form of a cylinder. The fastening region 3 has a circular cross-sectional area, at least in portions. Alternatively or additionally, the cross-sectional area may have a polygon-type cross section, at least in portions. The fastening region 3 extends axially from a clamping end of the drilling tool 1 as far as the working region 5, and is adjacent to the working region 5. In this case, the maximum radial extent, in particular a maximum diameter, of the drilling tool 1 increases in a transitional region between the fastening region 3 and the working region 5.

The fastening region 3 has positive-engagement means 15, realized as depressions, which may be provided to effect an improved, in particular positive-engagement, connection to the holding device 105 of the hand-held power tool 101. Alternatively or additionally, positive-engagement means 15 may be realized as protuberances. In an alternative embodiment, the fastening region 3 of the drilling tool 1 may also be realized without positive-engagement means 15. In particular, the fastening region 3 may be designed so as to correspond to an SDS fastening region.

The working region 5 adjoining the fastening region 3 comprises a main cutting element 7, in particular realized as a tip cutter, and two mutually opposite secondary cutting elements 9, in particular realized as tip cutters. The main cutting element 7 and the secondary cutting elements 9 are realized in the working body 6, at the end. The main cutting element 7 and the secondary cutting elements 9 in this case are connected, in particular in a materially bonded manner, preferably welded, to a working body 6 of the drilling tool 1. The secondary cutting elements 9 are spaced apart radially from the main cutting element 7.

The main cutting element 7 is preferably made of hard metal.

The working region 5 additionally comprises two grooves 13, extending helically around a longitudinal axis a of the drilling tool 1, which are realized in the working body 6 of the drilling tool 1. The two grooves 13 are parallel to each other. The two grooves 13 extend in an axially adjacent manner from a fastening region 3 of the drilling tool 1 and terminate adjacent to an end region 51 of the working region 5. An, in particular minimum, radial extent of the two grooves 13 is realized so as to be constant along an axial extent of the two grooves 13. Alternatively, an, in particular minimum, radial extent of the two grooves 13 may decrease, at least partly continuously and/or at least partly discontinuously, in the direction of the end region 51. The two grooves 13 are separated in the circumferential direction by webs 11. The webs 11 are therefore also parallel to the grooves 13 and, accordingly, are helical in form.

Figure 3:
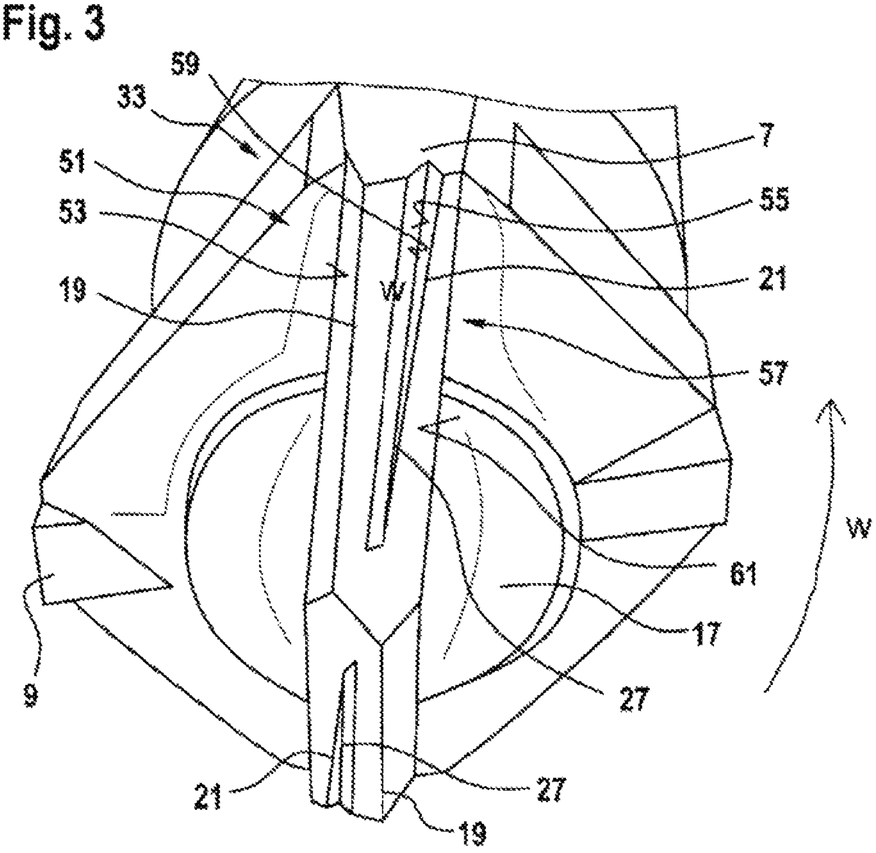

FIG. 3 shows a view of a second embodiment of the drilling tool 1. In this case, in this embodiment, the main cutting element 7, realized as a tip cutter, is realized in the working body 6, and the secondary cutting elements 9 are realized as a single piece with the working body 6, or integrally therefrom. A cross-sectional area of the end region 51 in this case is at least substantially of a polygon type, in particular substantially quadrilateral. At the end face the working region 5 has an elevation 17, in particular realized as a protuberance, which extends axially and radially in relation to the longitudinal axis a. The elevation 17 extends, at least substantially, in the form of a circle around the longitudinal axis a, in particular in a radially inner region of an end face of the drilling tool 1.

The two secondary cutting elements 9 extend in a radial direction out of the end region 51, and project in relation to the end region 51. The secondary cutting elements 9 each have a cutting edge 19, 21 for performing cutting work on the workpiece.

The main cutting element 7 has two first cutting edges 19, and respectively second cutting edges 21 set back from the two first cutting edges 19 axially along a longitudinal axis a in the direction towards the fastening region. The second cutting edge 21 is disposed parallel to the first cutting edge 19.

The first cutting edges 19 are realized symmetrically in relation to the longitudinal axis a of the drilling tool 1 and extend, starting from a drill-bit tip 31, to a circumferential region 33, in particular a circumferential surface, of the main cutting element 7. The second cutting edges 21 are likewise realized symmetrically in relation to the longitudinal axis a of the drilling tool 1. The second cutting edge 21 is in each case set back in relation to the first cutting edge 19, contrary to the direction of rotation w of the drilling tool 1. The second cutting edges 21 are each provided in a flank region of the first cutting edges 19. In an alternative embodiment, the second cutting edge 21 in each case is set back in relation to the first cutting edge 19, in the direction of rotation w of the drilling tool 1. In an alternative embodiment, the second cutting edges 21 may each provided in a rake face region of the first cutting edges 19.

A projection of the second cutting edge 21 on a plane formed orthogonally in relation to the longitudinal axis a of the drilling tool 1 is disposed parallel to the first cutting edge 19. In an alternative embodiment, a projection of the second cutting edge 21 may extend at an angle in relation to the first cutting edge 19 on a plane formed orthogonally in relation to the longitudinal axis a of the drilling tool 1.

The at least one second cutting edge 21 extends in a radial direction by up to 95% in relation to the at least one first cutting edge 19. In this case, a maximum axial extent of the at least one second cutting edge 21 extends by up to 95% in relation to the maximum axial extent of the at least one first cutting edge 19.

Provided between the first cutting edge 19 and the second cutting edge 21 there is a respective indentation 27 in the main cutting element 7.

The indentation 27 is realized in the axial direction, in particular in the form of a wedge, in the main cutting element 7. In this embodiment, the indentation 27 is delimited by the second cutting edge 21. The indentation 27 has at least two faces 55, 59, disposed transversely in relation to each other. The two faces 55, 59 form an edge 27, which is at least partly set back in relation to the first cutting edge 19 and the second cutting edge 21, contrary to the direction of advance. In particular, the edge 27 adjoins the second cutting edge 21 in a radially inner region of the end region 51, or converges with the second cutting edge 21. The two faces 55, 59 are each disposed at a distance from the first cutting edge 19. The indentation 27 preferably extends in a radially outer region of the main cutting element 7.

From a longitudinal axis a of the drilling tool 1, the first cutting edge 19 extends in the radial and the axial direction, and delimits a radial extent of the main cutting element 7 of the drilling tool 1. The first cutting edge 19 is realized by a rake face 53 and by a flank 61 that adjoins the first rake face 53. The flank 61 and, in particular, the indentation 27 in this case separate the first cutting edge 19 from the second cutting edge 21.

The second cutting edge 21 is realized by a contrary to the direction of rotation w by the flank 61 and the face 55, formed as a rake face, that adjoins the flank 61.

The rake face 53 is realized as a rake face of the first cutting edge 19. The The flank 61 is realized as a flank of the first cutting edge 19. The face 59 is realized as a second flank of the first cutting edge 19 that adjoins the flank 61. The face 55 is realized as a rake face of the second cutting edge 21.

In this embodiment, the flank 61 surrounds the indentation 27, such that the flank 61 also forms a flank of the second cutting edge 21.

Figure 4:
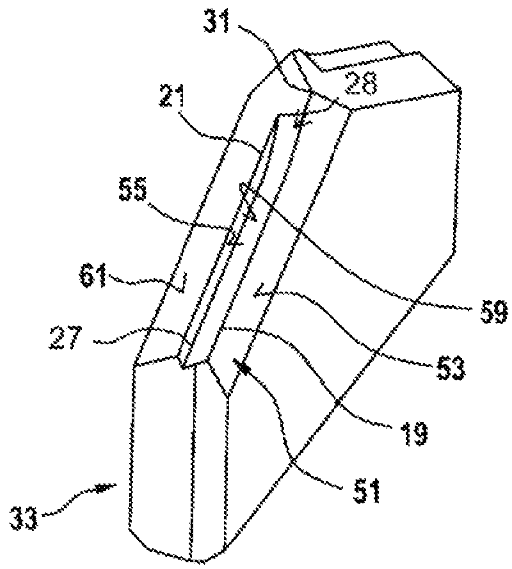

A further embodiment of the main cutting element 7 shown in FIG. 4. Unlike the embodiment according to FIG. 3, the indentation 27 is delimited by the first cutting edge 19 and the second cutting edge 21. In particular, the first cutting edge 19 is realized by the rake face 53 and the face 59 adjoining the rake face 53 and, in particular at least partly, the flank 61. The face 59 and the flank 61 in this case are realized as flanks of the first cutting edge 19.

The second cutting edge 21 is realized by a face 55 adjoining the face 59 contrary to the direction of rotation w and by the flank 61. The face 59 and the face 55 in this case realize the indentation 27.

Figure 5:
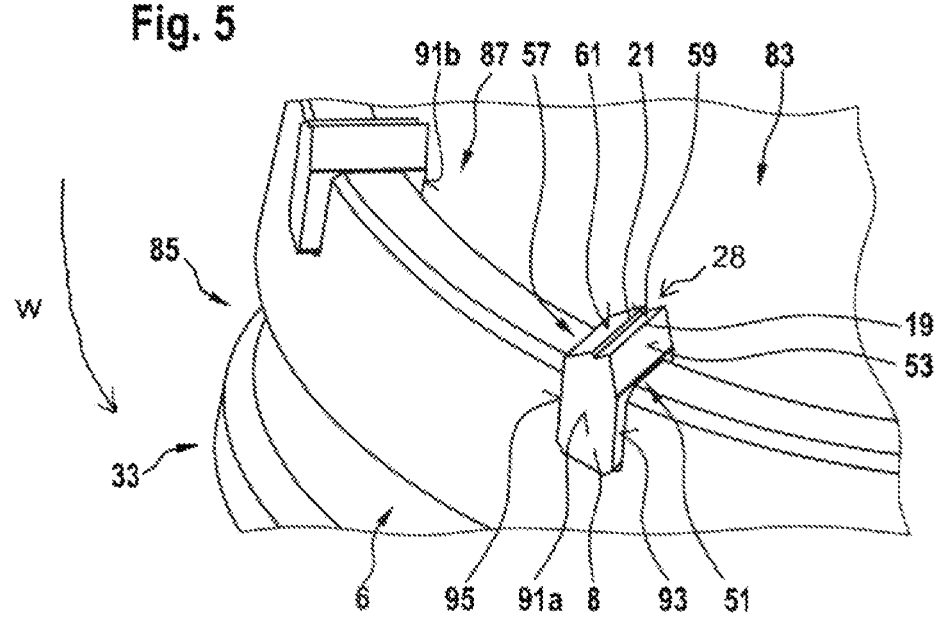
Figure 6:
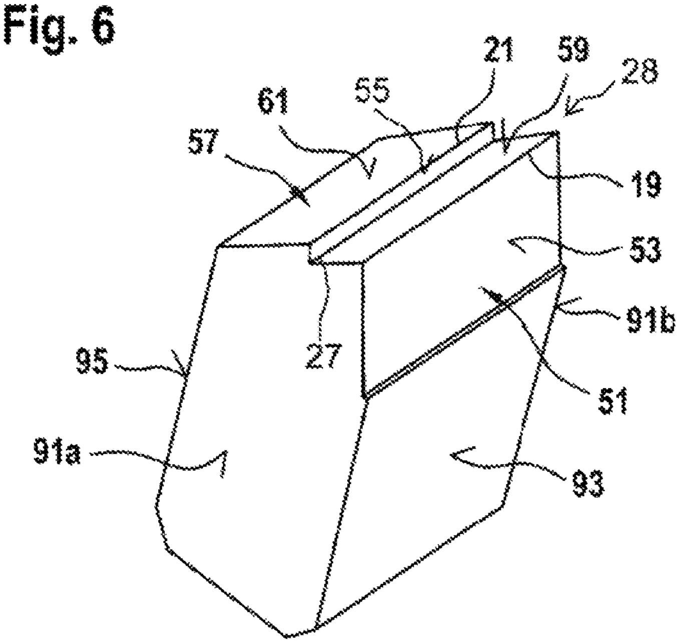

A fourth embodiment of the drilling tool 1 according to the disclosure is shown in FIG. 5 and FIG. 6, a cutting element 8 being realized such that it is at least substantially similar to the cutting elements 7, 9 of the first embodiment. The drilling tool 1 in this case is realized as a hollow drilling tool 1. The working body 6 in this case is realized, at least substantially, as a hollow cylinder. The working body 6 has a cylindrical inner region 83, in particular a cylindrically realized inner surface, and an outer region 85 disposed on the outside in relation to the inner region 83. The outer region 85 additionally has at least one groove 13, and at least one web 11 delimiting the groove 13. The groove 13 and the web 11 are at least substantially parallel to each other. The groove is helical in form, and extends around the hollow drilling tool 1, or the outer region 85 of the hollow drilling tool 1, around a longitudinal axis a.

The cutting elements 8 in this case are realized at the end, in a recess in an end region 87 of the hollow drilling tool 1, such that a front face 93 and a back face 87 of the cutting element 8 are connected to the working body 6 of the drilling tool 1 by positive engagement and/or in a materially bonded manner The cutting elements 8 extend transversely, in particular orthogonally, in relation to the inner region 83, in particular the inner faces, and the outer region 85, in particular the outer faces, of the working body 6. The cutting elements 8 have, on both sides, lateral faces 91 that delimit the cutting elements 8 in the radial direction. The lateral face 91*b* that faces towards the outer region 85 projects in relation to the outer face 85. The lateral face 91*a* of the cutting element 8 that faces towards the inner region 83 likewise projects in relation to the inner face 87. In an alternative embodiment, only one or no lateral faces 91 may also project in relation to the inner region 83, or the inner faces, and/or the outer region 85, or the outer faces.

The cutting elements 8 are realized such that they are substantially similar to the main cutting element 7, and likewise, as described, for example, in the second and/or third embodiment, have a first cutting edge 19 and a second cutting edge 21 set back in relation to the first cutting edge 19, contrary to the direction of advance and/or contrary to the direction of rotation. An indentation 27 is likewise provided between the first cutting edge 19 and the second cutting edge 21. The first cutting edge 19 and the second cutting edge 21 are disposed parallel to each other.

The first cutting edge 19 forms a first envelope, and the second cutting edge 21 forms a second envelope, such that the second envelope is set back axially in relation to the first envelope, contrary to the direction of advance of the hollow drilling tool 1. Preferably, a plurality of first cutting edges 19 of the cutting elements 8 are located on the first envelope. In particular, a plurality of second cutting edges 21 of the cutting elements 8 are located on a second envelope. The first envelope is disposed parallel to the second envelope.

What is claimed is:

1. A drilling tool for performing drilling and/or percussive work on materials, the drilling tool comprising: a fastening region; and a working region, the working region having a working body and at least one cutting element projecting axially and/or radially in relation to the working body, the at least one cutting element having a leading face portion with respect to a direction of rotation about a longitudinal axis of the drilling tool and a trailing face portion opposite to the leading face, the at least one cutting element having between the leading face portion and the trailing face portion at least one first cutting edge and at least one second cutting edge, wherein the at least one second cutting edge is configured to serve as a replacement cutting edge and/or as an auxiliary cutting edge, and wherein the at least one second cutting edge is set back in relation to the at least one first cutting edge of the drilling tool, axially along the longitudinal axis of the drilling tool, in a direction towards the fastening region, and wherein up to 70% of a maximum extent of the at least one second cutting edge is disposed parallel to the at least one first cutting edge.

2. The drilling tool according to claim 1, wherein:

during operation of the drilling tool, the at least one first cutting edge, in the case of a rotation about the longitudinal axis, defines a first envelope, and the at least one second cutting edge, in the case of a rotation about the longitudinal axis, defines a second envelope, and the second envelope is set back in relation to the first envelope, axially along the longitudinal axis of the drilling tool, in the direction towards the fastening region of the drilling tool.

3. The drilling tool according to claim 2, wherein the second envelope is set back at least partly in relation to the first envelope.

4. The drilling tool according to claim 1, wherein an indentation is provided in the at least one cutting element between the at least one first cutting edge and the at least one second cutting edge.

5. The drilling tool according to claim 4, wherein the indentation is an axial indentation.

6. The drilling tool according to claim 1, wherein the at least one second cutting edge is set back in relation to the at least one first cutting edge contrary to a direction of rotation of the drilling tool.

7. The drilling tool according to claim 1, wherein the at least one first cutting edge is set back in relation to the at least one second cutting edge contrary to a direction of rotation of the drilling tool.

8. The drilling tool according to claim 1, wherein the at least one second cutting edge is adjacent to a circumferential region of the drilling tool.

9. The drilling tool according to claim 1, wherein a maximum radial extent of the at least one second cutting edge extends no greater than 90% in relation to a maximum radial extent of the at least one first cutting edge.

10. The drilling tool according to claim 9, wherein the maximum radial extent of the at least one second cutting edge extends by up to 50% in relation to the maximum radial extent of the at least one first cutting edge.

11. The drilling tool according to claim 1, wherein a maximum axial extent of the at least one second cutting edge extends no greater than 90% in relation to a maximum radial extent of the at least one first cutting edge.

12. The drilling tool according to claim 11, wherein the maximum axial extent of the at least one second cutting edge extends by up to 50% in relation to a maximum radial extent of the at least one first cutting edge.

13. The drilling tool according to claim 1, further comprising:

a main cutting element, wherein the at least one cutting element is a secondary cutting element.

14. The drilling tool according to claim 1, wherein the drilling tool is configured to perform drilling and/or percussive work on materials such as stone, concrete and/or reinforced concrete.

15. The drilling tool according to claim 1, wherein the at least one cutting element is a cutting plate cutting element.

16. The drilling tool according to claim 1, wherein the at least one second cutting edge is set back at least partly in relation to the at least one first cutting edge.

17. The drilling tool according to claim 1, wherein the maximum extent is one of an axial maximum extent and a radial maximum extent.

18. The drilling tool of claim 1, the at least one cutting element further comprising:

a rake face extending axially from the leading face portion toward the at least one first cutting edge; and a flank extending axially from the trailing face portion toward the at least one first cutting edge, wherein the at least one second cutting edge is defined in part by the rake face or the flank, and wherein neither the first cutting edge nor the second cutting edge extend through a longitudinal axis of the drilling tool.

* * * * *